April 11, 1950 — C. S. COLLINS — 2,503,324
BOWLING SPAN MEASURING BALL
Filed Feb. 24, 1949 — 2 Sheets-Sheet 1

INVENTOR.
Charles S. Collins
BY Victor J. Evans & Co.
ATTORNEYS

April 11, 1950        C. S. COLLINS        2,503,324
BOWLING SPAN MEASURING BALL
Filed Feb. 24, 1949        2 Sheets-Sheet 2
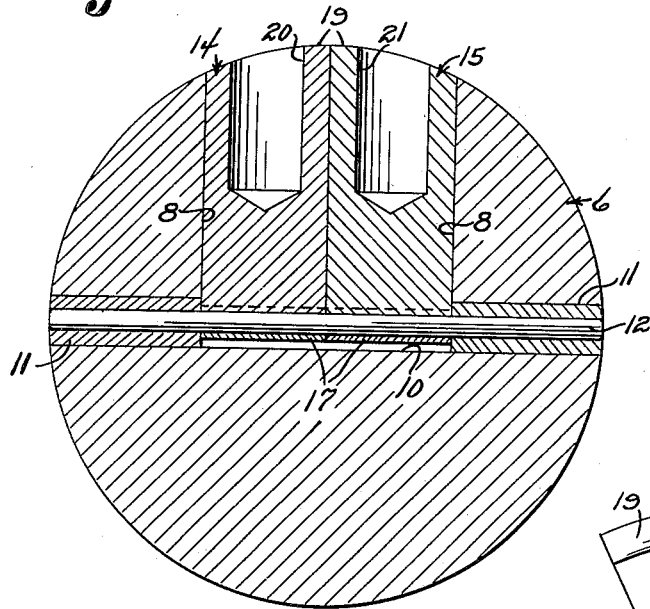
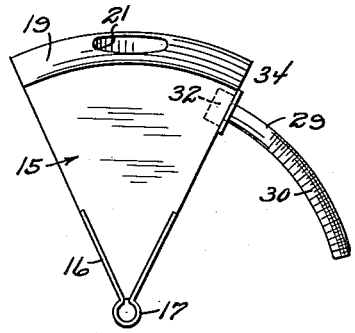
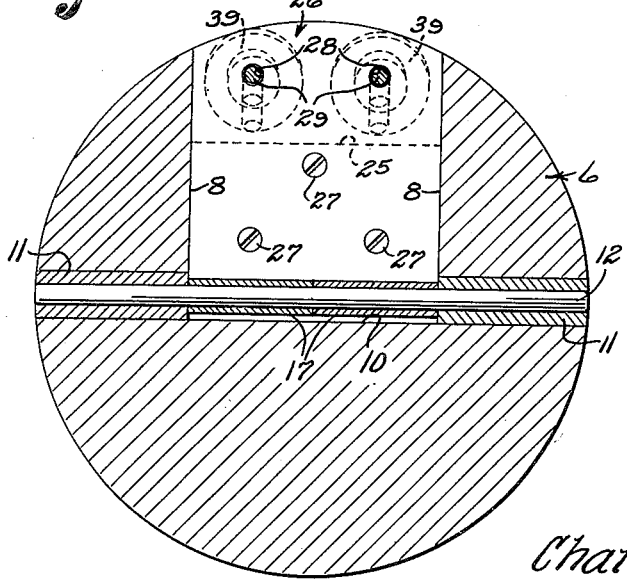
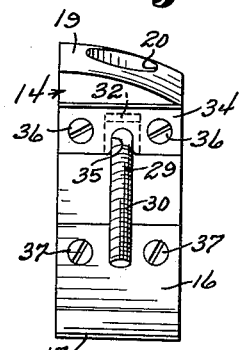
INVENTOR.
Charles S. Collins
BY Victor J. Evans & Co.
ATTORNEYS Patented Apr. 11, 1950

2,503,324

UNITED STATES PATENT OFFICE 2,503,324

BOWLING SPAN MEASURING BALL

Charles S. Collins, Dover, Ohio

Application February 24, 1949, Serial No. 78,131

1 Claim. (Cl. 33—174)

The present invention relates to measuring instruments, and more particularly to a device for measuring the grip span of a bowling ball.

One object of the invention is to provide a measuring device for measuring the grip span of a bowling ball so that bowling balls can be corectly constructed to suit the grip and hand size of individual bowlers.

Another object is to provide a measuring device which can be adjusted by means of a pair of angularly displaceable finger receiving members to produce the exact and correct grip span desired, whereby the prospective purchaser of a bowling ball can obtain one suitable to his individual hand and grip span.

Another object is to provide a measuring device which is of substantially the same shape and weight as a conventional bowling ball so that the individual can readily determine his grip span with an object having the same weight and shape as the bowling ball desired.

Another object is to provide a measuring device for determining the grip span of a bowling ball for a certain individual with considerable ease so that bowling balls of predetermined grip span dimensions can be produced to suit the physical conditions of individual bowlers.

Another object is to provide a measuring instrument for determining the grip span of a bowling ball for certain individuals which includes a pair of finger grip spherical sector-shaped portions which are movable relative to a fixed point or thumb receiving opening so that the correct positioning and triangulation of the finger receiving openings in a bowling ball can be conveniently determined and reproduced on a bowling ball for the individual.

Other objects and advantages of the invention will become apparent during the course of the following description of the accompanying drawings wherein:

Figure 4 is a diametrical cross-sectional view taken on the angularly displaced radial lines 4—4 of Figure 2 looking in the direction of the arrows and showing the manner in which the adjustable finger receiving circular sector-shaped elements are pivoted and rockably mounted to swing about a common axis.

Figure 5 is a diametrical cross-sectional view taken on the angularly displaced radial lines 5—5 of Figure 2 looking in the direction of the arrows and showing the sector-shaped retaining plate for the screw and nut adjusting mechanism.

Figure 6 is a side elevational view of one of the circular sector-shaped finger receiving elements, showing the general shape thereof and the manner in which the adjusting screw is affixed thereto.

Figure 7 is an end elevational view of one of the circular sector-shaped finger receiving elements showing the end plate for retaining the adjusting screw in position.

Figure 1:
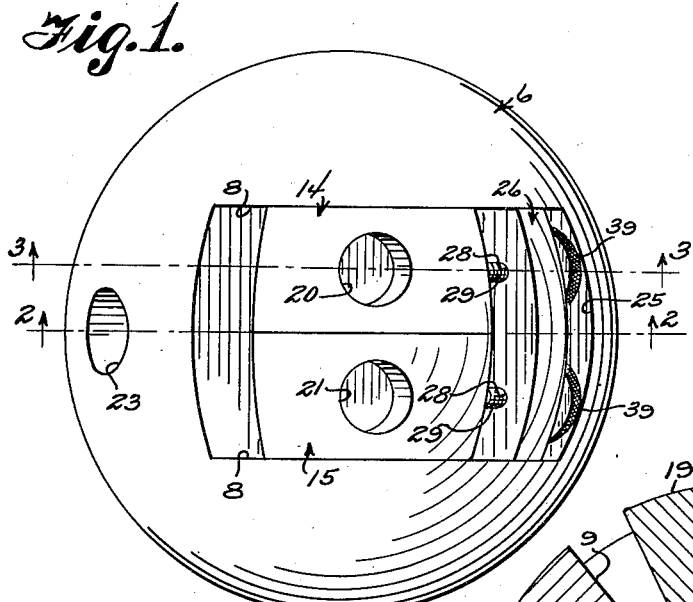
Figure 1 is a top elevational view of the measuring instrument showing the arrangement of the movably mounted finger receiving circular sector-shaped elements.

In the drawings, and more in detail, the bowling ball measuring device comprises a spherical body portion 6 having a sector-shaped opening 7 providing parallel walls 8 and angular wall surfaces 9 which extend at approximately 90° one to the other.

Figure 2:
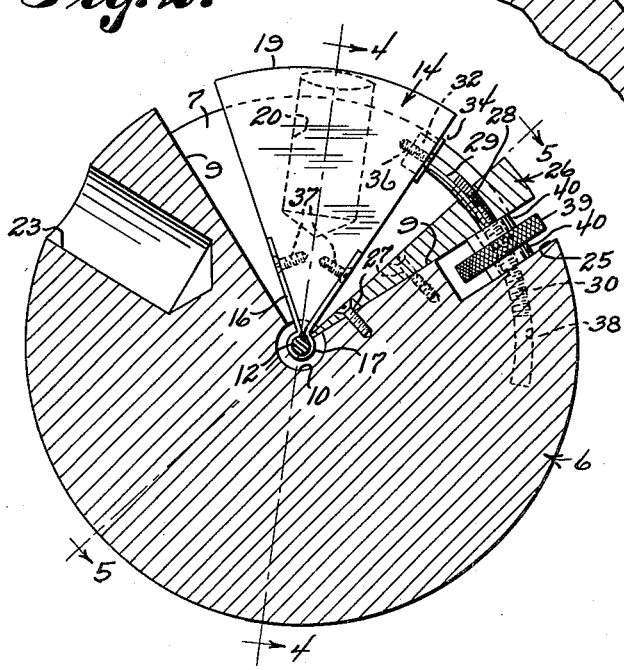
Figure 2 is a diametrical cross-sectional view taken on line 2—2 of Figure 1 looking in the direction of the arrows and showing the manner in which circular sector-shaped finger receiving elements are adjustably mounted and provided with screw and nut adjusting elements.
Figure 3:
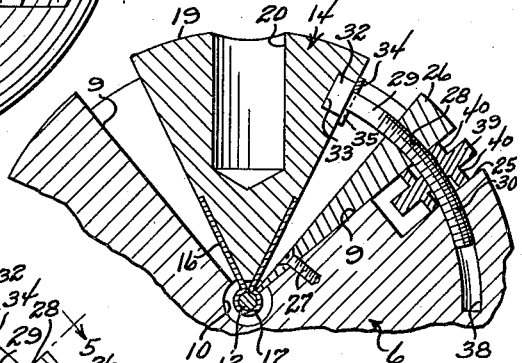
Figure 3 is a fragmentary cross-sectional view taken on line 3—3 of Figure 1 showing various details of construction of one of the circular sector-shaped elements and the adjusting screw and nut mechanism therefor.

Formed in the spherical body portion 6 is a diametrical bore 10 which intersects the vertex of the walls 9 as clearly illustrated in Figures 2 and 3. A pair of bushing members 11 are inserted in opposite ends of the diametrical bore 10 and are of a length to terminate at their inner ends in registry with the parallel walls 8 of the sector-shaped opening 7. Supported by the bushings 11 is a diametrical pin 12 which likewise intersects the vertex point of the angular walls 9 and is arranged to pivotally support a pair of sector-shaped adjustable finger gripping members 14 and 15 respectively which are formed with angular walls of an acute angle and arranged approximately 45° relative one to the other so that the adjustable finger gripping members 14 and 15 may be moved to and fro within the sector-shaped opening 7.

Each of the adjustable finger gripping members 14 and 15 are identical in construction and hence, a description of one will suffice for both, and as illustrated in Figure 6, a V-shaped hinge bracket 16 is secured to the angular wall surfaces of the adjustable finger receiving elements adjacent the apex of said walls, and said bracket is formed to provide a circular bearing portion 17 for receiving the diametrical pin 12. Thus, the adjustable finger receiving members 14 and 15 may be adjusted angularly about the axis of said pin.

Each of the adjustable finger receiving elements 14 and 15 have their outer wall surfaces 19 shaped to conform to the spherical contour of the body portion 6 to provide a continuous rounded surface, and formed in each of the finger receiving elements 14 and 15 are finger receiving openings 20 and 21 respectively. The opening 20 being adapted to receive the second finger, while the opening 21 is arranged to receive the third finger so that when the thumb is placed in a thumb receiving opening 23 in the spherical body portion 6 the second and third fingers may be likewise received in the openings 20 and 21.

One of the angular walls 9 of the spherical recess 7 is cut away as at 25 (Figs. 2 and 3), and a sector-shaped plate 26 is secured to the wall 9 by means of screws 27 to anchor the sector-shaped plate 26 in place. A pair of apertures or openings 28 are formed in the plate 26 for receiving a pair of arcuately curved threaded rods 29 having threaded portions 30, (Figs. 3 and 6). Heads 32 are formed on one end of the threaded rods 29 and are received in recesses 33 in the respective finger receiving members 14 and 15. Each of the finger receiving members is provided with a retaining strip or plate 34 having a notch 35 for receiving the threaded rod 29, and said plates 34 are held in place by suitable retaining screws 36, in a similar fashion to the supporting brackets 16 as by means of the screws 37, (Fig. 7).

Adjusting screw recesses or sockets 38 are formed in the spherical body portion 6 for receiving the free ends of the screw threaded rods 29 and said recesses are curved to conform to the rods. Adjusting nuts 39 are mounted in the recess 25 and are threaded correspondingly to the threaded portion 30 of the rods 29 in a manner to prevent binding. Oppositely disposed annular bosses 40 are formed on the adjusting nuts 39 and engage one of the walls of the recess 25 and one face of the sector-shaped plate 26 such as to prevent longitudinal movement of the adjusting nuts. The nuts are knurled on their peripheral surfaces to facilitate adjustment of the finger receiving members 14 and 15 by turning the nuts 39 in either direction.

In use, the prospective purchaser of a bowling ball inserts his thumb in the opening 23 and his second and third fingers respectively in the openings 20 and 21 of the finger receiving members 14 and 15. The adjusting nuts 39 are then rotated to position the openings 20 and 21 the correct distance from the thumb receiving opening 23 and enable the physical characteristics of the prospective bowler's grip span to be measured. When the grip span has been determined, a bowling ball can be produced which will exactly fit and conform to the physical characteristics of the bowler's grip span and enable the production of bowling balls to suit the different grip spans of various individuals.

Figure 8:
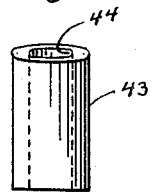
Figure 8 is a perspective view of a finger receiving bushing for insertion in the openings in the finger gripping members.
Figure 9:
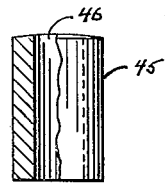
Figure 9 is an elevational view, with parts broken away and in section, of a thumb receiving bushing for insertion into the opening in the spherical body.

Further, in order to insure that the bowling ball will have finger openings which are of the correct dimensions, there is provided a bushing 43, Figure 8, which has a finger receiving bore 44 extending therethrough. One of the bushings 43 is adapted to be inserted or positioned in each of the openings 20 and 21 and a series of the bushings 43 may be provided with bores 44 of varying diameters so that the bowling ball can be formed with finger openings of the correct size. Similarly, a thumb receiving bushing 45, Figure 9, having a bore 46, is provided for insertion in the opening 23. A series of the bushings 45 may be provided, each having a different inside diameter in order to insure that the correct size of the thumb receiving opening will be provided with the finished ball.

It is to be understood, that the form of the invention shown and described is to be taken as a preferred embodiment and that various changes in the shape, size and arrangement of parts may be made without departing from the scope of the subjoined claim.

I claim:

In a device for determining the grip span and physical characteristics of individual bowlers, a spherical body portion having a sector-shaped opening providing a pair of spaced parallel walls and a pair of opposed wall surfaces, there being a bore extending diametrically through said body portion, a pair of aligned bushing members seated in said bore, a pin supported by said pair of bushing members, a pair of finger-gripping members adjustably mounted in said opening, a V-shaped hinge bracket secured to each of said finger-gripping members and including a circular bearing portion for receiving therein said pin, the outer wall surface of each of said finger-gripping members conforming in contour to said body portion, there being a finger-receiving opening in each of said finger-gripping members, said body portion having an opening for receiving therein the thumb, a plate arranged in the sector-shaped opening in said body portion and secured to the latter, there being a pair of spaced apertures arranged in said plate, there being a recess arranged in each of said finger-gripping members, a pair of arcuate rods extending through the apertures in said plate, a head mounted on an end of each of said rods and seated in said recess, a strip secured to each of said finger-gripping members for retaining said heads in said recesses, there being a pair of sockets arranged in said body portion for receiving therein said rods, an adjusting nut arranged in threaded engagement with each of said rods, and a pair of oppositely disposed annular bosses arranged on each of said nuts, said nuts having their outer peripheral surfaces knurled to facilitate manual rotation of said nuts.

CHARLES S. COLLINS.

REFERENCES CITED

The following references are of record in the file of this patent:

UNITED STATES PATENTS

| Number | Name | Date |
| --- | --- | --- |
| 2,207,403 | Hinkley | July 9, 1940 |
| 2,207,404 | Hinkley | July 9, 1940 |
| 2,314,811 | Akin | Mar. 23, 1943 |